Figure 1:
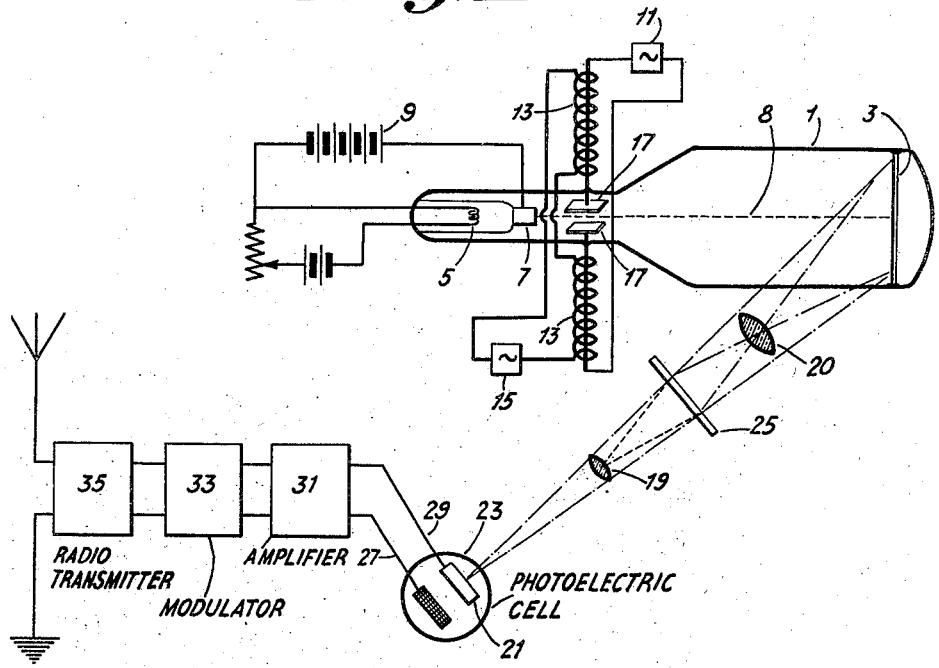

Jan. 4, 1938.   V. K. ZWORYKIN   2,104,066
TELEVISION SYSTEM
Filed Aug. 5, 1932

INVENTOR
V. K. ZWORYKIN
BY
ATTORNEY

Patented Jan. 4, 1938

2,104,066

UNITED STATES PATENT OFFICE 2,104,066

TELEVISION SYSTEM

Vladimir K. Zworykin, Haddonfield, N. J., assignor to Radio Corporation of America, a corporation of Delaware Application August 5, 1932, Serial No. 627,566

5 Claims. (Cl. 178—7.2)

This application is a continuation in part of my application Serial No. 576,485, filed November 21, 1931.

My invention relates, in general, to television systems.

The present invention is concerned particularly with the transmitting end of the system and forms a continuation in part of the invention disclosed by and embodied in an application relating to television systems for which I filed an application for Letters Patent Serial No. 683,337, on December 29, 1923. The present disclosure relates particularly to the modification disclosed in Figure 3 of the above-noted application and provides a novel system whereby any heat effect developed at the fluorescent screen of the cathode ray scanning device are prevented from adversely affecting the film or subject being scanned for image transmission purposes.

Scanning systems as heretofore proposed, with but few exceptions, have depended upon the use of the well-known Nipkow disk, the so-called Weiller wheel, or upon oscillatory mirror systems of various types. Although such systems have proved fairly satisfactory, they are subject to certain limitations imposed by reason of their mechanical construction and are somewhat difficult to maintain in satisfactory operative condition. Furthermore, rotary or oscillating scanning devices are inherently noisy in operation and, also, are to some extent dangerous.

One of the objects of my invention, therefore, is to provide simplified means whereby the scanning of an object to be televised may be accomplished.

A still further object of this invention is to provide a scanning system which operates entirely electrically.

Another object of my invention is to provide a scanning system, devoid of moving parts.

Another, and more specific object of my invention is to provide a scanning system that shall be noiseless and shall be highly efficient.

Still a further object of the invention is to provide a scanning system in which the subject or film to be scanned may be spaced a sufficient distance from the fluorescent screen of the cathode ray tube as to avoid any deleterious effect from heat produced at the fluorescent screen by the impact of the cathode ray.

Another object of the invention is to provide such an apparatus as referred to in the foregoing objects of invention wherein the scanning spot upon the film or other subject to be scanned may be reduced or enlarged, relative to the size of the spot upon the tube fluorescent screen, to any desired degree, thereby permitting accurate scanning and complete analysis of minute subjects or the scanning of the entire area of subjects considerably larger than sizes convenient or practical for the manufacture of the fluorescent screen.

Another object of the invention is the provision of a system, such as defined in the last above object, which is capable of selectively operating in such a manner as either to analyze a small subject with sufficient definition and so as to cover substantially the entire field of the device or to analyze the entire area of a larger subject.

The foregoing objects and others ancillary thereto I attain, in a preferred embodiment of my invention, by utilizing an ordinary cathode ray oscillograph both as a source of light for scanning purposes and as means for causing the light to explore successively the object to be televised.

More specifically, in accordance with my invention, I cause a cathode ray to traverse repeatedly a fluorescent screen along a series of horizontal paths at a given frequency and cause the said ray to traverse also the screen vertically in order that the horizontal scanning shall be repeated. The fluorescent screen is focused upon the cathode of a photoelectric cell through an appropriate lens system and the object to be televised, such as a diapositive or an ordinary photographic negative, is so interposed between the screen and the photoelectric cell that each portion thereof is successively explored by a light ray derived from the illumination produced from the bombardment of the fluorescent screen by the generated cathode ray.

In television systems, as in ordinary picture transmitters and the like, the output from the photoelectric cell is utilized to modulate the carrier frequency of a radio transmitter. A modulation system suitable for this purpose may either be analogous to that disclosed in my application hereinbefore mentioned, or may be any other system well known to those skilled in the art.

Figure 2:
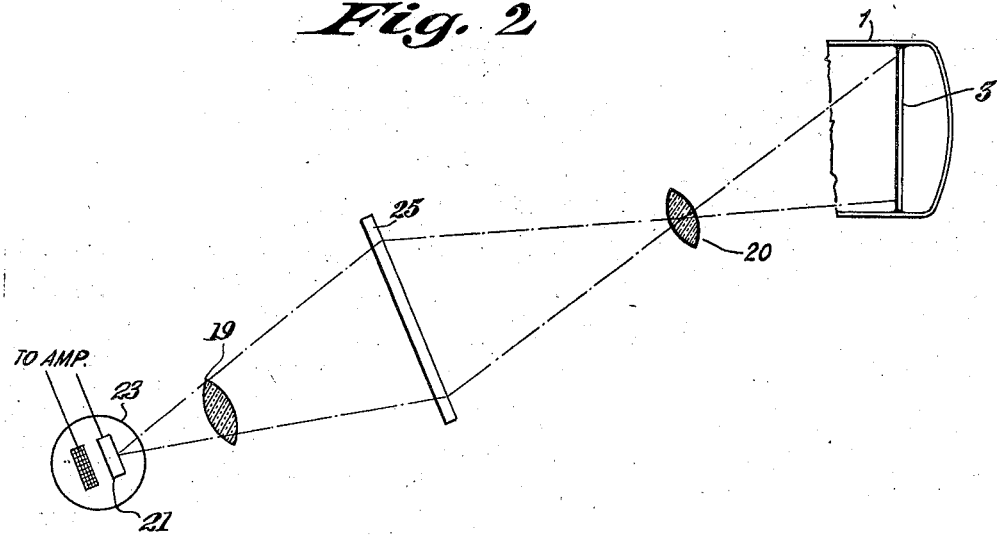

The novel features that I consider characteristic of my invention are set forth with particularity in the appended claims. The invention itself, however, both as to its organization and its method of operation, together with additional objects and advantages thereof, will become more apparent and best be understood from a consideration of the following description of a specific embodiment thereof in connection with the accompanying drawing in which Fig. 1 is a diagrammatic view of a portion of a television transmitting system constructed and arranged according to my invention, and Fig. 2 is a view of a portion of Fig. 1 modified to provide for scanning large size subjects.

As is well known to those skilled in the art, in order to televise an object, light from each successive portion or elemental area thereof must be caused to influence a photoelectric cell or other suitable light translating element. Further, if the object is in motion, it is necessary that the exploration thereof shall be repeated periodically at a rate of at least sixteen complete repetitions or scannings per second in order that the illusion of uninterrupted motion shall be conveyed to an observer at the receiving station. For the purpose of providing light with which to explore or scan an object to be televised, I find it expedient, therefore, to utilize a fluorescent screen in a cathode ray oscillograph. The screen of the cathode ray device is caused to fluoresce by the impact thereon of a stream of electrons derived from the cathode of the device, the stream being caused to scan repeatedly the screen according to a selected pattern under the influence of appropriate deflecting fields.

Specifically, referring to the drawing, I provide a cathode ray oscillograph constituted by an evacuated container 1 having positioned at substantially one end thereof a fluorescent screen 3. A source of electrons, such as a filament 5, and an accelerating anode 7 which is maintained at a positive potential with respect to the cathode by suitable means such as a battery 9 or the like are so positioned within the tube envelope as to direct the electron stream from the cathode to the fluorescent screen.

In order that the electron stream 8 shall repeatedly scan the fluorescent screen in one direction, I provide a source of alternating current 11, the terminals of which are connected to a plurality of deflecting coils 13. A similar source of alternating potential 15 is provided for periodically deflecting the ray at right angles to the scanning direction, the terminals of the last-named source being connected to a plurality of separated deflecting plates 17 within the tube, between which the electron stream or cathode ray 8 passes in its travel from the source toward the fluorescent screen.

The relative frequencies of the two sources are, preferably, such that the entire area of the screen is scanned at least sixteen times per second.

In order that the fluorescent screen shall satisfactorily furnish the light for scanning purposes, the entire screen is focused through an appropriate optical system, exemplified by lenses 19, and 20, upon the cathode 21 of a photoelectric cell 23. With this arrangement, although the fluorescent spot on the screen changes its position, the point on the cathode on which the light impinges does not change, as is obvious, thus minimizing variations in the photoelectric current which might be caused by unequal photosensitivity of different areas of the cathode of the light sensitive device.

It is in the arrangement of the lens system 19 and 20 only that the system of Fig. 2 differs from the showing in Fig. 1 since in the system of the former it is possible by producing an enlarged image of the light spot produced by the bombardment of the tube fluorescent screen 3 upon the subject or film to be scanned so that subjects of considerably larger area than the screen 3 may be scanned, whereas by forming a reduced size image of the light spot on the fluorescent screen upon the subject, as shown by Fig. 1, small size subjects may be analyzed or scanned for transmission.

The object to be televised such as, for example, a diapositive or an ordinary photographic negative 25, is disposed between the lens system and the fluorescent screen and, accordingly, receives light from the screen 3 at such times as the screen is caused to fluoresce, point by point, under the action of the position controlled electron stream 8.

Inasmuch as the light spots which appear to traverse the screen due to the influence of the deflecting coils and plates upon the cathode ray 8 to control the point at which the ray impinges upon the screen 3, it will be obvious that the light received by the photographic negative or other object 3 and in turn focused by a part of the lens system upon the photoelectric cell 23 must successively traverse each portion or elemental area of the photographic negative or other object of which an image is to be transmitted. Such being the case, it is clear that the output from the photoelectric cell will be a fluctuating current having an amplitude variation truly representative of the variation in intensity of light and shadow for each successive point or elemental area of the object being televised.

In order that the fluctuating current output from the photo-cell 23 may be utilized, the terminals 27 and 29 of the photoelectric cell may be connected to an amplifier 31 which, in turn, influences a modulator 33 and a radio transmitter 35 of any desired or appropriate type.

The variation of the output current of the photoelectric cell causes the carrier frequency to be modulated in accordance therewith and, consequently, in accordance with the intensity of the light as modified by each successive point or element area of the negative or other object being scanned.

At the receiving station, any desired and well known system, or the system disclosed in my original application previously referred to, may be utilized for reconstructing the televised picture from the incoming radio signals.

It should further be obvious to those skilled in the art that my invention is not limited to the use of a cathode ray oscillograph wherein the fluorescent screen is constructed exactly as shown in the drawing. Many other oscillographs are available of the type wherein the screen is constituted by a semi-transparent coating on the larger end thereof. When such a tube is used, it is, of course, clear that the photographic negative may be so disposed adjacent to the end of the tube that the light from the screen may be more efficiently utilized.

From a consideration of the foregoing, it should be apparent that a scanning system constructed according to my invention offers many advantages. It is entirely electrical in operation, is noiseless and, since it has no moving parts, the scanning frequencies may be made as high as desirable.

Although I have chosen a particular embodiment of my invention for purposes of illustration, many modifications thereof will at once be apparent to those skilled in the art to which it pertains. My invention, therefore, is not to be limited except insofar as is necessitated by the prior art and by the spirit and scope of the hereinafter appended claims.

Having now described my invention what I claim and desire to secure by Letters Patent is the following:

1. In television scanning systems, an electron tube having a fluorescent screen, means for producing over substantially the entire area of the screen a series of like intensity light spots each of a predetermined elemental area and traversing the screen according to a predetermined scanning pattern, a subject of which the image is to transmitted positioned adjacent the tube and upon the side of the screen adjacent the light generating means, an adjustable optical system for directing the light spot intensities having a predetermined ratio to the area of the original spot to coordinated areas of the subject to test the elemental area light values thereof, a light translating element, and adjustable optical means for focusing light of intensity varying with the variations in intensity of light and shadow on elemental areas of the subject tested upon the light sensitive element.

2. In television scanning systems, an electron tube having a fluorescent screen, means for producing over substantially the entire area of the screen a series of like intensity light spots each of a predetermined elemental area and traversing the screen according to a predetermined scanning pattern, a subject of which the image is to be transmitted positioned adjacent the tube and upon the side of the screen adjacent the light generating means, an adjustable optical system for directing the elemental area light spot intensities to coordinated reduced size areas of a subject smaller than the area illuminated to test the elemental area light values thereof, a light translating element, and adjustable optical means for focusing light of intensity varying with the variations in intensity of light and shadow on elemental areas of the subject tested upon the light sensitive element.

3. In television scanning system, an electron tube having a fluorescent screen, means for producing over substantially the entire area of the screen a series of like intensity light spots each of a predetermined elemental area and traversing the screen according to a predetermined scanning pattern, a subject of which the image is to be transmitted positioned adjacent the tube and upon the side of the screen adjacent the light generating means, an adjustable optical system for directing the elemental area light spot intensities to coordinated enlarged size areas of a subject larger than the area illuminated to test the elemental area light values thereof, a light translating element, and adjustable optical means for focusing light of intensity varying with the variations in intensity of light and shadow on elemental areas of the subject tested upon the light sensitive element.

4. In a television system, a cathode ray tube provided with a fluorescent screen structure, means disposed on one side of said screen structure and operable to develop and direct a cathode ray toward the screen structure to produce a light spot thereon, means for deflecting the said ray to scan said screen structure according to a predetermined pattern, a subject and a light translating device disposed exteriorly of the tube, an adjustable optical system positioned between the screen structure and the subject to form a spot of light on the subject, and a second adjustable optical system positioned to form always an image of the illuminated spot of the subject on the light translating device.

5. In a television system, a cathode ray tube provided with a fluorescent screen structure, means disposed on one side of said screen structure and operable to develop and direct a cathode ray toward the screen structure to produce a light spot thereon, means for deflecting the said ray to scan said screen structure according to a predetermined pattern, a translucent subject and a light translating device disposed exteriorly of the tube and in register with each other and the side of the screen toward which the cathode ray is directed, an adjustable optical system between the screen and the subject for forming a spot of light on the subject, and a second adjustable optical system positioned between the subject and the light translating device to form always an image of the illuminated spot of the subject on the light translating device, the angle between the axis of the ray developing means and the optical systems being less than forty-five degrees.

VLADIMIR K. ZWORYKIN.